(12) United States Patent
Reilly

(10) Patent No.: US 8,423,670 B2
(45) Date of Patent: Apr. 16, 2013

(54) ACCESSING DISTRIBUTED SERVICES IN A NETWORK

(75) Inventor: Sean David Reilly, Charles City, VA (US)

(73) Assignee: Corporation for National Research Initiatives, Reston, VA (US)

( * ) Notice: Subject to any disclaimer, the term of this patent is extended or adjusted under 35 U.S.C. 154(b) by 1019 days.

(21) Appl. No.: 11/340,231

(22) Filed: Jan. 25, 2006

(65) Prior Publication Data

US 2007/0174461 A1 Jul. 26, 2007

(51) Int. Cl.
*G06F 15/16* (2006.01)

(52) U.S. Cl.
USPC ........... 709/245; 709/206; 709/220; 709/238; 370/392; 370/465

(58) Field of Classification Search ........... 709/238, 709/245, 241, 219, 206, 220; 370/392, 465
See application file for complete search history.

(56) References Cited

U.S. PATENT DOCUMENTS

| | | | | |
|---|---|---|---|---|
| 6,470,389 | B1* | 10/2002 | Chung et al. | 709/227 |
| 6,742,036 | B1 | 5/2004 | Das et al. | |
| 6,889,259 | B2* | 5/2005 | Kapoor | 709/245 |
| 7,003,574 | B1* | 2/2006 | Bahl | 709/228 |
| 7,095,754 | B2* | 8/2006 | Benveniste | 370/465 |
| 7,590,738 | B2* | 9/2009 | Mendonca | 709/226 |
| 2002/0002622 | A1* | 1/2002 | Vange et al. | 709/245 |
| 2002/0027915 | A1* | 3/2002 | Foti et al. | 370/392 |
| 2002/0083166 | A1* | 6/2002 | Dugan et al. | 709/223 |
| 2002/0112076 | A1* | 8/2002 | Rueda et al. | 709/245 |
| 2002/0163933 | A1* | 11/2002 | Benveniste | 370/465 |
| 2002/0194335 | A1* | 12/2002 | Maynard | 709/225 |
| 2003/0012139 | A1* | 1/2003 | Fukumoto et al. | 370/235 |
| 2003/0033412 | A1 | 2/2003 | Sundaresan et al. | |
| 2003/0115259 | A1* | 6/2003 | Lakshmi Narayanan | 709/203 |
| 2003/0196117 | A1 | 10/2003 | Kenmochi et al. | |

(Continued)

FOREIGN PATENT DOCUMENTS

| | | |
|---|---|---|
| CN | 1452081 | 10/2003 |
| EP | 0 865 180 A2 | 9/1988 |

(Continued)

OTHER PUBLICATIONS

Tuexen et al., "Architecture for Reliable Server Pooling", IETF Standard-Working-Draft, Internet Engineering Task Force, vol. rserpool, No. 8, Oct. 24, 2004, pp. 1-21.

(Continued)

*Primary Examiner* — Wing F Chan
*Assistant Examiner* — Razu Miah
(74) *Attorney, Agent, or Firm* — Fish & Richardson P.C.

(57) ABSTRACT

A set of multiple servers in which each server (a) provides a service having a name or other identifier, and for which each server (b) has a network address that differs from the network addresses of the other servers in the set, and (c) is co-located with a resolution mechanism that maps a name or other identifier of the service that is received from a client to a network address that is local to the resolution mechanism. The resolution mechanisms are operated to enable a client to choose one of the servers as being currently operational and/or accessible to provide the service to the client, and to so choose the server without the client needing to first access the chosen server.

20 Claims, 2 Drawing Sheets

U.S. PATENT DOCUMENTS

| | | | |
|---|---|---|---|
| 2004/0039798 A1* | 2/2004 | Hotz et al. | 709/219 |
| 2004/0073549 A1* | 4/2004 | Turkel et al. | 707/5 |
| 2004/0235473 A1* | 11/2004 | Sanchez | 455/435.2 |
| 2005/0060427 A1* | 3/2005 | Phillips et al. | 709/238 |
| 2005/0080890 A1* | 4/2005 | Yang et al. | 709/223 |
| 2006/0129695 A1* | 6/2006 | Faibish et al. | 709/245 |
| 2006/0218279 A1* | 9/2006 | Yamaguchi et al. | 709/226 |
| 2007/0118630 A1* | 5/2007 | Hashimoto et al. | 709/223 |
| 2010/0238945 A1* | 9/2010 | McKernan et al. | 370/401 |

FOREIGN PATENT DOCUMENTS

| | | |
|---|---|---|
| EP | 0 865 180 | 9/1998 |
| EP | 1 503 534 | 2/2005 |
| JP | 2001-92766 | 4/2001 |
| JP | 2001-273225 | 10/2001 |
| WO | WO 2006/002660 | 1/2006 |
| WO | 2006/002660 | 12/2006 |

OTHER PUBLICATIONS

Chinese Office Action dated Aug. 3, 2010, from corresponding App. Ser. No. 2007-10101647.3, 8 pages (with English translation).
Chinese Office Action dated Feb. 27, 2012, from corresponding App. Ser. No. 2007-10101647.3, 8 pages (with English translation).
Japanese Office Action dated Mar. 8, 2012, from corresponding App. Ser. No. 2007-014045, 12 pages (with English translation).
Chinese Office Action dated Oct. 11, 2012, from corresponding App. Ser. No. 2007-10101647.3, 21 pages (with English translation).

* cited by examiner

ACCESSING DISTRIBUTED SERVICES IN A NETWORK

BACKGROUND

This description relates to accessing distributed services in a network.

Figure 1:
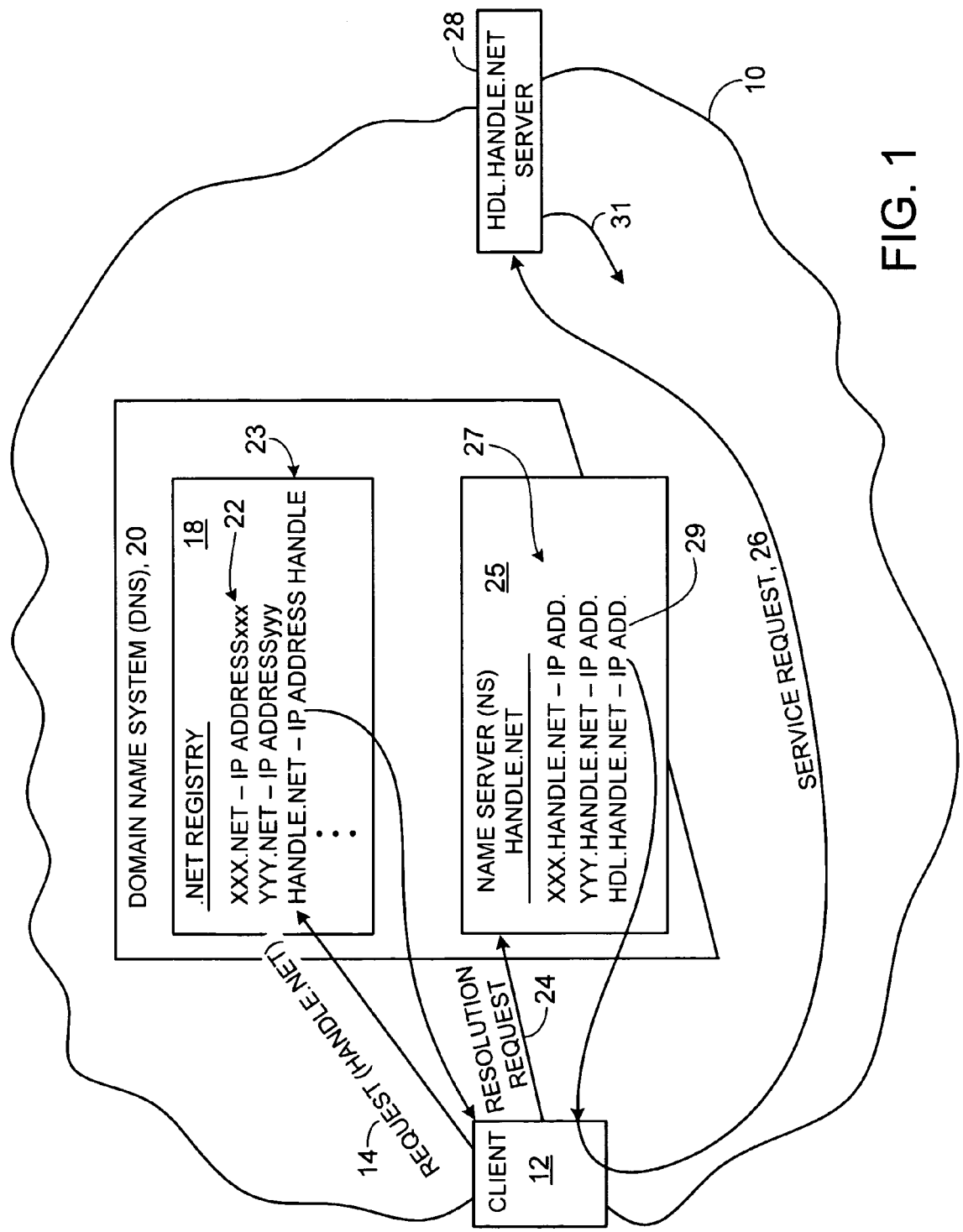

As shown in FIG. 1, the Internet 10 is a distributed system of networks, computers, and services. Within the Internet, clients 12 that need services provided by servers 28 at other locations use Internet Protocol (IP) addresses (which identify those other locations) to send service requests 26 to those servers. A typical IP address is a number that is either 32 bits long (under the IPv4 protocol) or 128 bits long (under the IPv6 protocol).

Although IP addresses are generally arbitrary values, they can be associated with domain/sub-domain names that have semantic meaning. For example, a sub-domain/domain name such as hdl.handle.net could be associated with an IP address. The system used in the Internet to associate domain/subdomain names with IP addresses is called the Domain Name System (DNS) 20. Although various naming and other identifier systems currently exist within the Internet, the example used for illustration is the DNS. In the following, the term domain name(s) is used to include sub-domain names at any level.

To reach the server 28 that provides the service called hdl.handle.net, a DNS client 12 (sometimes referred to as simply a client) can present a request 14 that includes the domain name handle.net to a ".net" registry 18 within the DNS. The registry contains entries 22 that associate IP addresses with corresponding domain names that end in ".net". The registry finds the entry 23 for handle.net and the associated IP addresses for one or more Name Servers (NS) 25. A NS is part of the DNS and contains entries 27 that associate sub-domain names, such as those that end in handle.net, with IP addresses of corresponding servers. The registry returns the IP addresses of the NSs to the client.

The client then sends a resolution request 24 to the identified NSs 25 at the IP addresses provided by the registry. The resolution request 24 includes the sub-domain name hdl.handle.net. Each of the NSs is tried in turn until one of the NSs returns the IP address of hdl.handle.net 29 to the client. In other schemes, the NSs could be tried in parallel or using other selection criteria. The client uses that IP address to send its service request 26 to the hdl.handle.net server 28. Assuming that the hdl.handle.net server in fact resides at that IP address and is functioning, the server acts to satisfy 31 the client's request.

Each domain and sub-domain normally has more than one NS. This arrangement provides reliable access by the client to one of the NSs. However, there is no guarantee that the selected NS will provide the client an IP address for a server that is functioning and/or accessible by the client, because the NSs do not test the servers for availability before providing the IP address of the servers to the client, and they do not test connectivity between the client and the servers.

When a server malfunctions or its service is otherwise unavailable, various techniques have been developed to provide reliable equivalent access to the service by a client.

Figure 2:
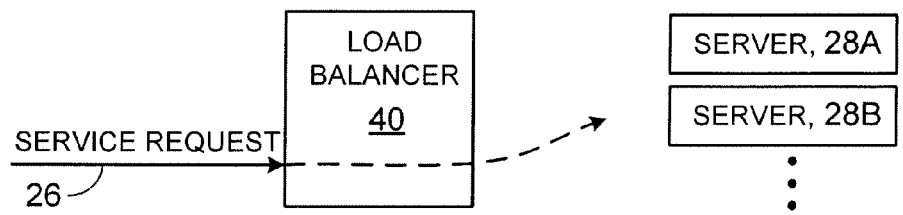

As shown in FIG. 2, one approach is to provide multiple redundant instances 28A, 28B, . . . , of a server for a given service. The servers may be located behind a load balancer 40 or a gateway. In this case, called a cluster, the IP address of the load balancer or gateway is the address that the DNS would typically associate with the sub-domain/domain name. When the client makes a service request 26 to the IP address specified for the cluster, the request is received by the load balancer or gateway and forwarded to one of the servers. The load balancer can distribute requests among the multiple servers to balance the load and, if one of the servers fails, direct all requests away from the failed server. If the entire cluster fails or becomes unavailable, the client is left without service from that cluster.

Figure 3:
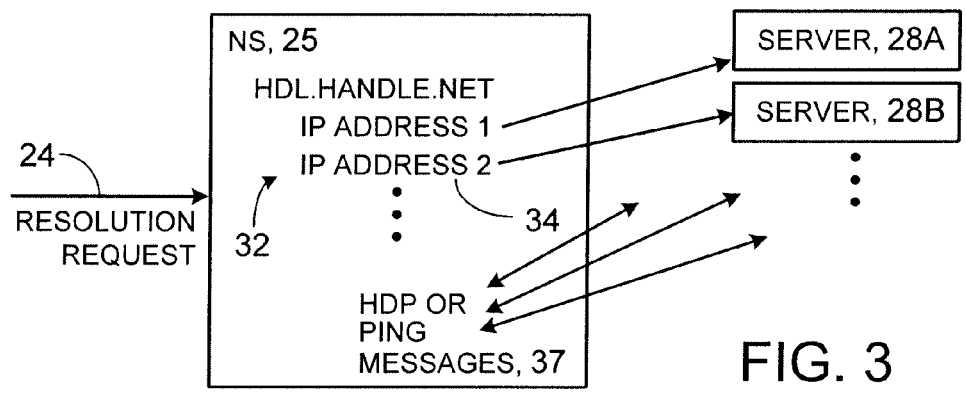

As shown in FIG. 3, in other approaches, the multiple redundant instances of the server 28 have different IP addresses and the domain name of a desired service can be resolved to any of those IP addresses. Each NS 25 maintains a list 32 of all IP addresses 34 of the redundant servers 28 and can return all of the addresses (or just selected addresses) to the client when a resolution request 24 is received. The client can then choose a server that is available and functioning, and (ideally) in proximity to the client's location on the network. In most cases, the client software will simply use the first address returned from the resolution mechanism without attempting to verify whether that address is the optimal choice or even accessible to the client.

To reduce the chance that the NS will direct the client to a non-functioning or otherwise unavailable server, some systems make a real-time check at each of the IP addresses to make sure the service is actually available and functioning there. For example, the real-time check can be made by User Datagram Protocol (UDP) or ping (ICMP echo request packets sent to the target; the return packets enable estimates of the round-trip time and packet loss rate between the nodes) messages 37. Although the DNS does not mandate such tests, having the NS do the testing would take advantage of the reliability of the DNS to assure that the client will be served.

In another arrangement, each of the servers is paired with a specialized network server (SNS). The NS used for the given domain name is customized so that it tracks the availability of its paired server. When it receives the domain name resolution request, the SNS uses some method to determine which of the available servers is closest, in the network sense, to the client and returns the IP address of that server to the client. Any SNS for which there was no network path to the client or from the NS will be dropped off the list of possible IP addresses that may be used as NS resolution responses.

The server that provides the desired service may conform to a variety of protocols associated with the service it provides. For a service provided by a Hyper-Text Transfer Protocol (http) server, for example, the request will commonly be expressed as a Uniform Resource Locator (URL), e.g., http://hdl.handle.net/<resourceid>, where hdl.handle.net is the domain name of a known set of servers and <resourceid> denotes a service or other resource available at that any of the servers of that set.

SUMMARY

In general, in one aspect, each server of a set of multiple servers (a) provides a service having a name or other identifier, (b) has a network address that differs from the network address of each of the other servers in the set, and (c) is co-located with a resolution mechanism that maps a name or other identifier that is received from a client to a network address that is local to the resolution mechanism. The resolution mechanisms are operated to enable a client to choose one of the servers as being currently operational and/or accessible to provide the service to the client, and to so choose the server without the client needing to first access the chosen server.

In some examples, the service can be provided in different versions by different servers, and in other examples, the service is provided identically at different servers.

Implementations may include one or more of the following features. The choice of the server depends on a protocol used by the resolution mechanism. The choice of the server depends on one or more performance attributes of one or more of the servers. The performance attributes may include measured response times or a measure of relative closeness of the resolution mechanism to the client. The performance attributes of the servers are stored in the client and updated from time to time. Some updating of the performance attributes is derived from requests for resolution as they occur. The server chosen by the client is the one that responds first to a resolution request from the client. The resolution mechanism has the same address as the server with which it is co-located. Access to the service is obtained by the client if any one server and its co-located resolution mechanism are working and/or accessible. Some of the co-located NSs and servers are clustered and may be accessed using a single network address. Access to the service is obtained by the client if at least one resolution mechanism within the cluster and one server within the cluster are working and/or accessible. The servers comprise proxy servers. The proxy servers access back-end services. A name service registry enables manual removal of network addresses of servers without disrupting the resolution mechanism. The resolution mechanism co-located with a given server checks the status of the service and ceases responding to resolution requests from clients when the service is not functioning. The resolution mechanism requires a valid input code from the client. The valid input code is used to determine whether or not the resolution mechanism should respond. For example, if multiple sets of servers are deployed on the network, those clients specifically authorized to use one of the sets of servers will use their input codes to enable the authorized service.

Other aspects may include other combinations of the features mentioned above and other features, expressed as methods, apparatus, systems, program products, and in other ways.

Other advantages and features will become apparent from the following description and from the claims.

DESCRIPTION

FIG. 1 is a diagram of the Internet.

Figure 4:
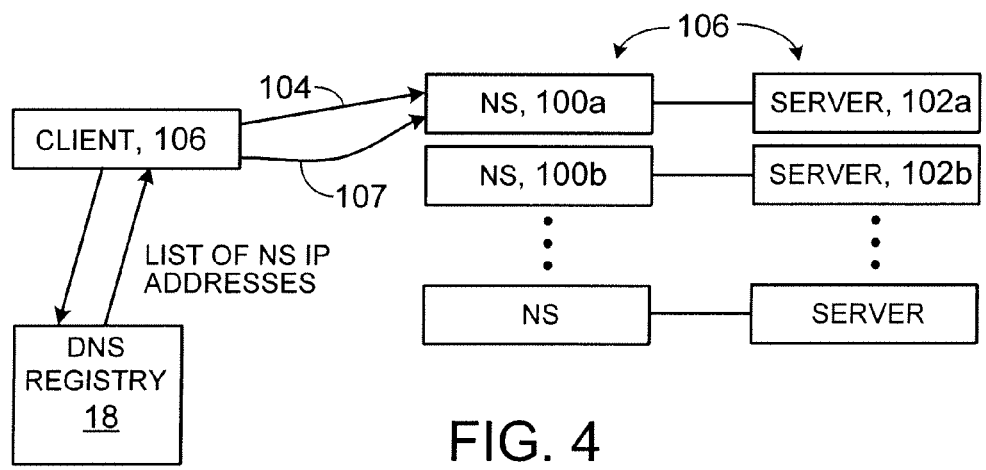

FIGS. 2, 3, and 4 are block diagrams that depict the domain name resolution mechanisms.

As shown in FIG. 4, by providing a resolution mechanism (e.g., an NS) 100*a*, 100*b*, . . . co-located with each of a set of redundant servers 102*a*, 102*b*, . . . (all of which redundantly provide a service that has a name or identifier, for example, hdl.handle.net), and using the inherent optimization and redundancy of the resolution mechanism to provide high reliability, benefits similar to those of more complex and expensive solutions can be provided more simply and less expensively. In using the term "co-located", we include, for example, two processes running on a single computer and operating system, or accessible using a single IP address, for example, to access a cluster of servers.

In FIG. 4, each NS is designated as a name server for the domains that it serves, e.g., hdl.handle.net. The IP address of the NS is included in the list of IP addresses for the domain name, e.g., hdl.handle.net, in the DNS registry 18. The IP address of the NS is set to be the same as the IP address of the server, although the DNS would not normally use that information directly; rather the client would go through its prescribed series of steps (discussed below) without knowing of this coincidence.

In some implementations, each NS is a conventional NS, except that when it receives a name resolution request 104 from a client 106, for the designated domain name, e.g., hdl.handle.net, the NS will return its own IP address to the client. Because it is then known that the client 106 was able to connect with the NS using the IP address of the NS, the client should have no difficulty successfully having its service request 107 completed by the server that is co-located on the same server machine, by simply using the IP address of the NS and having the NS return the IP address of the co-located server. In the event of a cluster having multiple services (each with its co-located NS), the NS would return the IP address of the gateway to the cluster.

Conversely, if the client is not able to connect to one of the NSs, the client will send its resolution request to the next NS in the list of IP addresses originally provided by the DNS registry, until the client finds an NS that is reachable. The client can maintain its own list of the NS IP addresses and information about which ones were reachable and were closest, in a network sense, to the client. After a large number of requests, the client will typically be able to automatically determine an optimal performing NS to which to send resolution requests.

Each NS can also be configured to check 106 the status of the co-located server. If the server does not respond, the NS withholds any response to client resolution requests. The clients will then be caused to send their resolution requests to other NSs. Each NS can also be configured to permit that NS to be taken out of circulation for maintenance without disrupting the provision of the service through other NSs.

This approach provides a reliable means of access to a network-based service including generally rapid failover, except when a client has cached an IP address of a non-functioning NS. If so, the client would have to wait N minutes (the time to live (TTL) of the IP address record for the NS) before being redirected to a different NS.

Although the IP address of each of the NSs in FIG. 4 may be the same as the IP address of the co-located server, alternatively (or in addition) multiple servers, all nominally identical in providing the same service redundantly, may be clustered behind a gateway that knows how to select one of the servers that is functioning. In such an architecture, the IP address of the gateway will be given to the client and will thus differ from the IP address of the NS. Because the DNS registry lists all designated NSs, if any NS is operating, the client will be informed of an IP address to use for the server and will know that the server is very likely to be accessible at that time. In such a clustered environment, if one of the servers in the cluster were to fail after reporting that it was functioning, the gateway would automatically direct the client to another functioning server in the cluster. If the NS does not respond, it is highly likely that the co-located server is not functioning either.

In some implementations, the servers to be addressed by the clients are proxy servers that map web queries into redirect commands to other web sites. The redirect commands are given by the proxy servers based on information that they access from a highly reliable back end system.

One example of such proxy servers, mentioned earlier, provides reliable access to an alternate identifier and/or resolution system by deploying (for reliability) many proxy servers on the Internet, each called, for example, hdl.handle.net. Any of the proxy servers will provide the correct corresponding URL as an answer to a client's service request that includes an identifier. Each proxy server is paired with a simple customized NS that implements the DNS interface specifications and returns only the IP address of that server (which is nominally identical to the IP address of the NS, except in cases in which the servers are clustered, in which case the returned IP address is the address of the gateway to the cluster). Because the client is able to connect with the NS, it should also be able to connect to the co-located proxy server, especially if it resides on the same machine, or the NS has made a local test of the proxy server for availability.

The IP addresses of all the NSs are listed as NS records in the DNS registry. When the client uses the first NS that responds with an IP address, normally, the associated server will be the best server to use, because it responded the fastest. However, software at the client tracks the response time from each NS. If, later, the NS takes longer than the response from another NS in the past, the choice of server can be changed dynamically. Reliable and efficient access to the proxy servers is achieved.

In a more reliable implementation, the NS can be modified to test the proxy server before responding. If the proxy server is not responding, the NS will stop responding, which will cause clients to communicate with a different NS. A mechanism is added to each NS so that selected instances of the resources can be manually taken out of circulation for maintenance without disrupting the proxy service.

It may be useful to set the time-to-live (TTL) values for the proxy server IP addresses to small values. The larger the TTL values, the longer each client will continue to talk to a certain proxy server once it has already made contact with it. With respect to the described proxy servers, a TTL value in the range of 5 to 15 minutes would be a good choice.

After the NS resolution mechanism involving the use of distributed NSs is invoked, the client is directed to whichever proxy server corresponds to the NS that the client successfully talks to first. Because the client can talk to the NS on the same machine, it is almost guaranteed that it can also talk to the proxy server. This system takes advantage of reliability and performance benefits of DNS for services that do not already incorporate a reliability mechanism (e.g. the http protocol used by today's web browsers).

The approach requires that an NS be installed at every server and the DNS registry must be kept up to date. If one server fails, specific clients may time-out on that NS before continuing on to the next one (however they should only time-out once in every 24-hour period, assuming the NS record TTL is 24 hours). Also, it is likely that servers will not fail often, so normally there will not be much delay.

An application that depends on the DNS client to provide it with an IP address that is assured to reach a working server will fail if the DNS fails to provide such an address. The techniques described above assure that the existing DNS will not fail to do so, assuming that the DNS is properly operating according to its specification, and that at least one NS/server pair is operating properly on the net.

Implementations that do not depend on the DNS in this way are also possible.

For example, an alternate resolution system may be used to map identifiers to information about digital objects being identified. In some implementations, this information is used to access repositories that contain digital objects. In many cases, only one repository would house the digital object and if the client cannot gain access to that repository, the application running on the client will fail. For other applications, however, the digital object would be replicated (for reliability and ease of access) in multiple repositories any one of which would suffice to access the digital object. If the application cannot test all the possible repositories to see which one might be accessible, a limited form of the resolution system software could be placed at each repository, or within each cluster of repositories. If queried, the resolution system software would respond only if the co-located repository were working and accessible. Thus, acting on responses it receives, the application would have a very high likelihood of success in locating a working and/or accessible repository.

Other implementations are also within the scope of the following claims.

The invention claimed is:

1. A method comprising:
for a set of multiple servers in which each server (a) provides a service having an identifier, (b) has a network address that differs from the network addresses of the other servers in the set, and (c) has a network address that is the same as the network address of a co-located resolution mechanism that maps the identifier that is received from a client requesting the service to that network address, the identifier received from the client not necessarily containing the network address of the server,
where a list of the network addresses of the resolution mechanisms is obtained by operation of a resolution protocol supported by those resolution mechanisms:
operating the resolution mechanisms to enable a client to choose one of the servers as being currently operational and/or accessible to provide the service to the client, without the client needing to first access the chosen server to make that determination.

2. The method of claim 1 in which the choice of the server depends on a protocol used by the resolution mechanism.

3. The method of claim 1 in which the choice of the server depends on one or more performance attributes of one or more of the servers.

4. The method of claim 3 in which the performance attributes may include measured response times or a measure of relative closeness of the resolution mechanism to the client.

5. The method of claim 3 in which the performance attributes of the servers are stored in the client and updated from time to time.

6. The method of claim 5 in which updating of the performance attributes is derived from requests for resolution as they naturally occur.

7. The method of claim 1 in which the server chosen by the client is the one that responds first to a resolution request from the client.

8. The method of claim 1 in which access to the service is obtained by the client if any server and its co-located resolution mechanism are working and/or accessible.

9. The method of claim 1 in which some of the co-located resolution mechanisms and servers are clustered and are accessible using a single network address.

10. The method of claim 9 in which access to the service is obtained by the client if at least one resolution mechanism within the clustered co-located resolution mechanisms and one server within the clustered servers are working and/or accessible.

11. The method of claim 1 in which the servers comprise proxy servers.

12. The method of claim 11 in which the proxy servers access back-end services.

13. The method of claim 1 in which a name service registry enables manual removal of network addresses of servers without disrupting the resolution mechanism.

14. The method of claim 1 in which the resolution mechanism co-located with a given server checks the status of the server and ceases responding to resolution requests from clients when the server is not available.

15. The method of claim 1 in which each server and its co-located resolution mechanism are accessible using the same network interface.

16. The method of claim 1 in which the identifier comprises a domain name.

17. A system comprising:
   one or more machines in a network on which a set of multiple servers reside, each server providing a service having an identifier;
   each server having a network address that differs from the network addresses of the other servers in the set, the network address of each server being the same as the network address of a co-located resolution mechanism that maps the identifier that is received from a client requesting the service to that network address, the identifier received from the client not necessarily containing the network address of the server;
   where a list of the network addresses of the resolution mechanisms is obtained by operation of name resolution protocol supported by those resolution mechanisms; and
   the resolution mechanisms enabling a client to choose one of the servers as being currently operational and accessible to provide the service to the client, and to identify the server without the client needing to first access the chosen server to make that determination.

18. The system of claim 17 in which each server and its co-located resolution mechanism are accessible using the same network interface.

19. The system of claim 17 in which the identifier comprises a domain name.

20. A method comprising:
   for a set of multiple servers in which each server (a) provides a service having an identifier, (b) has a network address that differs from the network addresses of the other servers in the set, and (c) has a network address that is the same as the network address of a co-located resolution mechanism that maps the identifier that is received from a client requesting the service to that network address, the identifier received from the client not necessarily containing the network address of the server,
   operating the resolution mechanisms to enable a client that has obtained network addresses of the resolution mechanisms to choose one of the servers as being currently operational and/or accessible to provide the service to the client, without the client needing to first access the chosen server to make that determination.

* * * * *